United States Patent [19]

Kunieda et al.

[11] Patent Number: 5,726,974
[45] Date of Patent: Mar. 10, 1998

[54] RECEIVING CIRCUIT HAVING A FREQUENCY COMPENSATED LOCAL OSCILLATION CIRCUIT

[75] Inventors: Yoshinori Kunieda, Kawasaki; Yuuri Yamamoto, Yokohama; Kenichi Takahashi, Kawasaki, all of Japan

[73] Assignee: Matsushita Electric Industrial Co., Ltd., Osaka, Japan

[21] Appl. No.: 666,838

[22] Filed: Jun. 19, 1996

[30] Foreign Application Priority Data

Jun. 20, 1995 [JP] Japan ................. 7-152877

[51] Int. Cl.⁶ .................. H04J 11/00; H04L 27/744
[52] U.S. Cl. .................. 370/206; 370/210; 375/362; 455/192.2
[58] Field of Search .................. 370/203, 206, 370/208, 480, 491, 210; 375/362, 344, 325–327, 371, 373, 375; 455/71, 182.2, 197.1, 192.2, 181.1, 191.1, 255, 257, 258, 259

[56] References Cited

U.S. PATENT DOCUMENTS

| 4,485,477 | 11/1984 | Nossen | 375/344 |
| 5,291,081 | 3/1994 | Takeuchi et al. | 455/192.1 |
| 5,345,440 | 9/1994 | Gledhill et al. | |
| 5,471,464 | 11/1995 | Ikeda | 370/203 |
| 5,544,200 | 8/1996 | An | 375/344 |
| 5,550,812 | 8/1996 | Philips | 370/203 |
| 5,608,764 | 3/1997 | Sugita et al. | 375/344 |

*Primary Examiner*—Chau Nguyen
*Attorney, Agent, or Firm*—Pollock. Vande Sande & Priddy

[57] ABSTRACT

A receiving ckt for receiving a transmitted SIG including FRQ divided carriers, comprises: a FRQ conversion ckt responsive to the LO SIG with a LO for generating a LO SIG with LO FRQ controlled according to a FRQ CONT SIG for FRQ converting the transmitted SIG into an IF SIG; a orthogonal signal separation ckt separating the IF SIG into I and Q components; a complex FFT conversion ckt for complex FFT converting the I and Q components and outputting conversion SIGs to be decoded arranged in FRQ base; an ELEC PWR measurement ckt measuring values of ELEC PWRs of the conversion SIGs; and a prediction ckt for predicting a CTR FRQ of the FRQ divided carriers from a FRQ distribution of the values of ELEC PWRs from the ELEC PWR measurement ckt and generating the FRQ CONT SIG according to the predicted center FRQ. The CTR FRQ may be detected by a REF carrier detection ckt responsive to the complex FFT processing ckt detecting a REF carrier or a carrier pattern included in the transmitted SIG. A correlation between the conversion SIGs and a REF SIG having values varied every predetermined interval within a symbol period is detected to generate the FRQ CONT SIG, wherein a phase compensating ckt for compensating phase of the conversion SIGs in response to the FRQ CONT SIG may be provided.

3 Claims, 10 Drawing Sheets

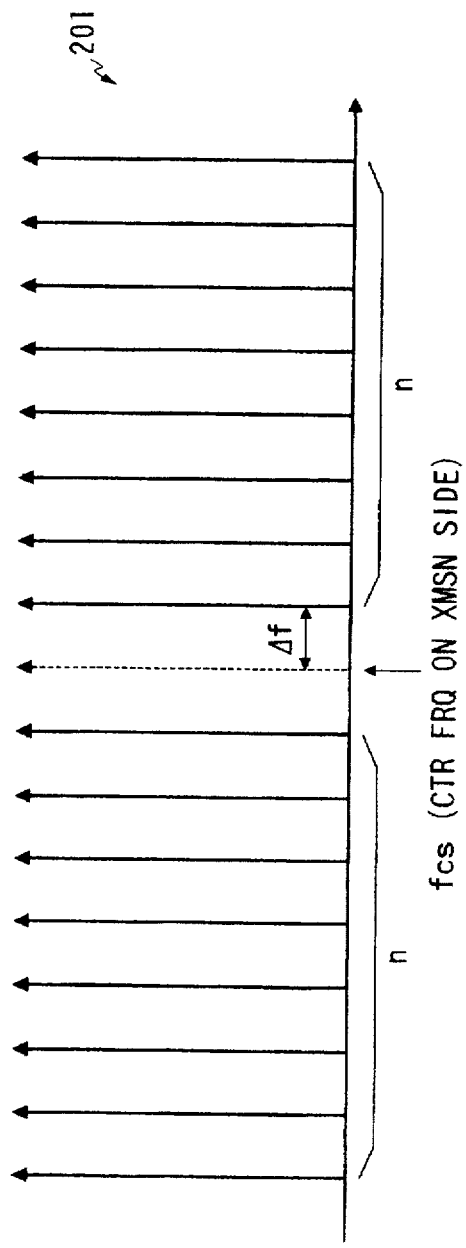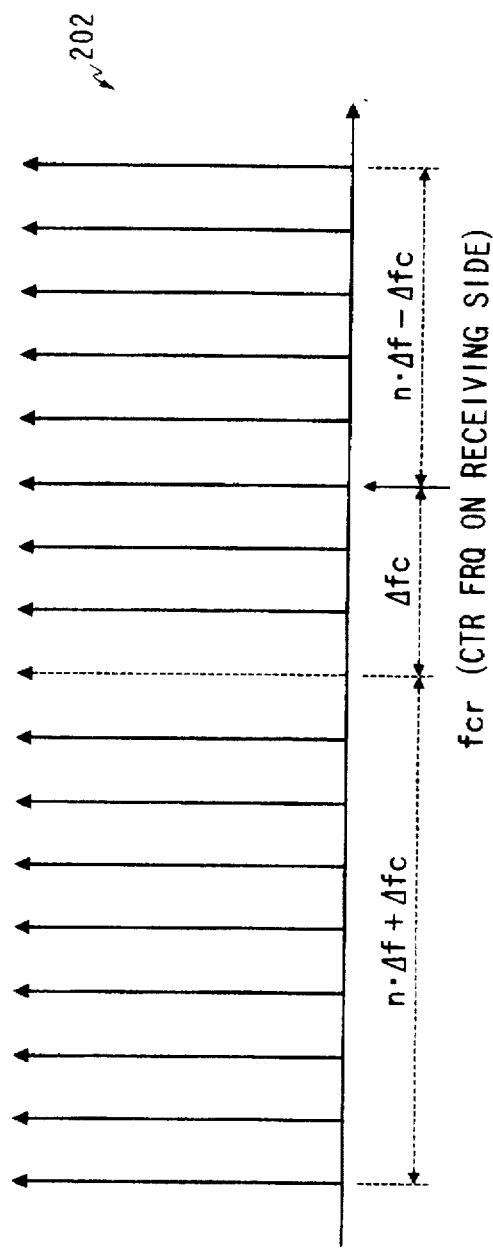
FIG. 2A
FIG. 2B

RECEIVING CIRCUIT HAVING A FREQUENCY COMPENSATED LOCAL OSCILLATION CIRCUIT

BACKGROUND OF THE INVENTION

1. Field of the Invention

This invention relates to a receiving circuit with its local oscillation frequency compensated which is used for demodulating a coded orthogonal frequency division multiplex modulation signal.

2. Description of the Prior Art

A receiving circuit with its local oscillation frequency compensated for receiving a coded orthogonal frequency division multiplex modulation signal using a local oscillation signal to frequency convert a received coded orthogonal frequency division multiplex modulation signal, is known. Such a multi-carrier transmission system is provided to prevent a receiving disturbance such as multipath transmission. That is, an affection of the multipath is suppressed by increasing the number of carriers and making symbol intervals of respective carriers longer.

FIG. 10 is a block diagram of a prior art receiving circuit with its local oscillation frequency compensated used for demodulating a coded orthogonal frequency division multiplex modulation signal.

A received modulation signal 1001 is subjected to a frequency conversion processing and a filtering processing by a filtering and frequency conversion circuit 1002. The filtering and frequency conversion circuit 1002 has a local oscillator for generating a local oscillation signal used for frequency conversion. A local oscillation frequency is controlled in accordance with a frequency control signal. An output of the filtering and frequency conversion circuit 1002 is supplied to an orthogonal signal separation circuit 1003 which supplies complex baseband signals to a complex FFT (fast Fourier transform) processing circuit 1004. The complex FFT processing circuit 1004 affects an FFT processing to the complex baseband signals. Outputs of the complex FFT processing circuit 1004 are supplied to a decoding circuit 1005 and to complex multiplier 1007. The decoding circuit 1005 decodes the outputs of the complex FFT processing circuit 1004 to reproduce transmitted input data.

Synchronization on the receiving side is affected by a frame and symbol synchronizing circuit 1006. The frame and symbol synchronizing circuit 1106 detects a frame by detecting a non-signal period such as a zero symbol which has been inserted into data to be transmitted in a frame in the transmission data, and detects and obtains a symbol synchronizing with the frame synchronizing established. The complex FFT processing circuit 1004 affects complex FFT processing with a time window which is adjusted by the output of the frame and symbol synchronizing circuit 1006. The output of the complex FFT processing circuit 1004 is successively complex-multiplied by a reference signal from a reference signal generator 1008 to obtain a correlation between the output of the complex FFT processing circuit 1004 and the reference signal. The result of the complex multiplier 1007 is subjected to an inverse FFT processing by a complex IFFT processing circuit 1009. A frequency error calculation circuit 1010 predicts a frequency error due to a variation in the transmission path from the result of the complex IFFT processing circuit 1009. A result of the frequency error calculation circuit 1010 is fed back to a local oscillation circuit in the filtering and frequency conversion circuit to compensate the local oscillation frequency. In this prior art receiving circuit, it is required that the reference frequency is approximately the same and there is a delay in the generation of the frequency error signal and there is a transition error in the center frequency because this processing is performed every frame.

SUMMARY OF THE INVENTION

The aim of the present invention is to provide an improved receiving circuit with its local frequency compensated.

According to this invention, a first receiving circuit for receiving a transmitted signal digitally coded orthogonal-frequency-division multiplex-modulated to have multiplexed sub-carriers is provided, which comprises: a local oscillator for generating a local oscillation signal having an oscillation frequency controlled in accordance with a frequency control signal; a frequency conversion circuit responsive to the local oscillation signal for frequency converting the transmitted signal into an intermediate frequency signal; an orthogonal signal separation circuit for separating the intermediate frequency signal into in-phase and qaudrature-phase components; a complex FFT conversion circuit for affecting a complex FFT conversion processing to the in-phase and quadrature-phase components and outputting conversion signals to be decoded arranged in frequency base; an electric power measurement circuit for measuring the electric powers of the conversion signals; and a prediction circuit for predicting a center frequency of the multiplexed sub-carriers from a frequency distribution of electric powers detected by the electric power measurement circuit and generating the frequency control signal in accordance with the predicted center frequency, the local oscillator generating the local oscillation signal so as to reduce an error between the oscillation frequency and the predicted frequency.

According to this invention, a second receiving circuit for receiving a transmitted signal digitally coded orthogonal-frequency-division-multiplex-modulated to include multiplexed sub-carriers including a reference carrier having a first characteristic distinguishable from any other multiplexed sub-carriers provided. The second receiving circuit comprises: a local oscillator for generating a local oscillation signal having an oscillation frequency controlled in accordance with a frequency control signal; a frequency conversion circuit responsive to the local oscillation signal for frequency converting the transmitted signal into an intermediate frequency signal; an orthogonal signal separation circuit for separating the intermediate frequency signal into in-phase and quadrature-phase components; a complex FFT conversion circuit for affecting a complex FFT conversion processing to the in-phase and quadrature-phase components and outputting conversion signals to be decoded; a reference carrier detection circuit for detecting one of conversion signals which has a second distinguishable characteristic corresponding to the first distinguishable characteristic; a center frequency prediction circuit for detecting a frequency of one of conversion signals which has the second distinguishable characteristic from the reference carrier detection circuit and for predicting the center frequency of the transmitted signal from the detected frequency and generating the frequency control signal in accordance with the predicted center frequency.

In the second receiving circuit, the first characteristic is that a magnitude (electric power) of the reference carrier has a larger magnitude than any other multiplexed sub-carriers and the second characteristic is that a magnitude of one of the conversion signals has a larger magnitude than any other conversion signals. The reference carrier detection circuit comprises: a magnitude detection circuit for detecting magnitudes of the conversion signals from the complex FFT conversion circuit; and a detecting circuit for detecting one of conversion signals corresponding to the reference carrier from detected magnitudes.

According to this invention, a third receiving circuit is provided for receiving a transmitted signal digitally coded, and orthogonal-frequency-division-multiplex-modulated to include multiplexed sub-carriers having a first distribution including a first mark portion at a predetermined frequency. The third receiving circuit comprises: a local oscillator for generating a local oscillation signal having an oscillation frequency controlled in accordance with a frequency control signal; a frequency conversion circuit responsive to the local oscillation signal for frequency-converting the transmitted signal into an intermediate frequency signal; an orthogonal signal separation circuit for separating the intermediate frequency signal into in-phase and quadrature-phase components; a complex FFT conversion circuit for affecting a complex FFT conversion processing to the in-phase and quadrature-phase components and outputting conversion signals to be decoded, the conversion signals having a second distribution, corresponding to the first distribution, the second distribution having a second mark portion corresponding to the first mark portion; a mark detection circuit for detecting the second mark portion; a frequency detection circuit for detecting a frequency of the second marker portion; a prediction circuit for predicting a center frequency of the multiplexed sub-carriers from the second marker portion from the frequency detection circuit and generating the frequency control signal in accordance with the predicted center frequency.

In the third receiving circuit, the first mark portion comprises one of the multiplexed sub-carriers having a different magnitude from any other of the multiplexed sub-carriers mark. The detection circuit comprises: a magnitude detection circuit for detecting magnitudes (electric powers) of the conversion signals; a comparing circuit for comparing the detected magnitudes to each other; and a detection circuit for detecting the second mark portion from the result of the comparing circuit.

In the third receiving circuit, the multiplexed sub-carriers have a first distribution such that the multiplexed sub-carriers are recurrently arranged in frequency base with a first intermission at a predetermined frequency as the first marker portion, the conversion signals have a second distribution such that the conversion signals are recurrently arranged in frequency base with a second intermission, as the second marker portion, which corresponds to the first intermission and the mark detection circuit comprises: a first detecting circuit for detecting the second distribution from the conversion circuit; and a second detection circuit responsive to the first detecting circuit for detecting the second intermission to detect the second marker portion.

According to this invention, a fourth receiving circuit is provided. The fourth receiving circuit comprises, in addition to the structure of the first receiving circuit, an offset signal generation circuit responsive to the prediction circuit for generating an offset signal causing the oscillation frequency to change the local oscillation frequency with a unit less than a Frequency interval of the multiplexed sub-carriers.

According to this invention, a fifth receiving circuit is provided for receiving a transmitted signal, which is digitally coded orthogonal-frequency-division multiplex-modulated by data every symbol period having multiplexed sub-carriers, the transmitted signal including a reference symbol data. The fifth receiving circuit comprises: a local oscillator for generating a local oscillation signal having an oscillation frequency controlled in accordance with a frequency control signal; a frequency conversion circuit responsive to the local oscillation signal for frequency converting the transmitted signal into an intermediate frequency signal; an orthogonal signal separation circuit for separating the intermediate frequency signal into in-phase and quadrature-phase components; a complex FFT conversion circuit for affecting a complex FFT conversion processing to the in-phase and quadrature components and outputting conversion signals to be decoded every symbol period; a complex multiplier circuit for complex multiplying the conversion signals by a reference signal every symbol period and detecting a correlation between the conversion signal and the reference signal; a reference signal generation circuit for generating the reference signal having complex values corresponding to the reference symbol, the complex values being successively changed every predetermined interval within the symbol period so as to change the correlation such that the local oscillation frequency is changed around an intermediate frequency of the multiplexed sub-carriers; a complex inversion FFT conversion circuit for affecting an inversion complex FFT conversion processing to outputs of the complex multiplier circuit every symbol period; a frequency error calculation circuit for calculating a frequency error of the oscillation frequency from the complex inversion FFT conversion circuit within the symbol period and generating the frequency control signal in accordance with the frequency error.

The fifth receiving circuit may further comprise a phase compensation circuit for compensating the phases of the conversion signals in accordance with the detected frequency error and outputting phase compensated signals to be decoded.

BRIEF DESCRIPTION OF THE DRAWINGS

The object and features of the present invention will become more readily apparent from the following detailed description taken in conjunction with the accompanying drawings in which:

FIG. 2A is a graphical drawing of a spectrum of a transmission signal to the receiving circuit of the first embodiment;

FIG. 2B is a graphical drawing of a spectrum of the multi-carriers to be received by the receiving circuit of the first embodiment when there is a frequency error;

The same or corresponding elements or parts are designated with like references throughout the drawings.

DETAILED DESCRIPTION OF THE INVENTION

Hereinbelow will be described a first embodiment of this invention.

Figure 1:
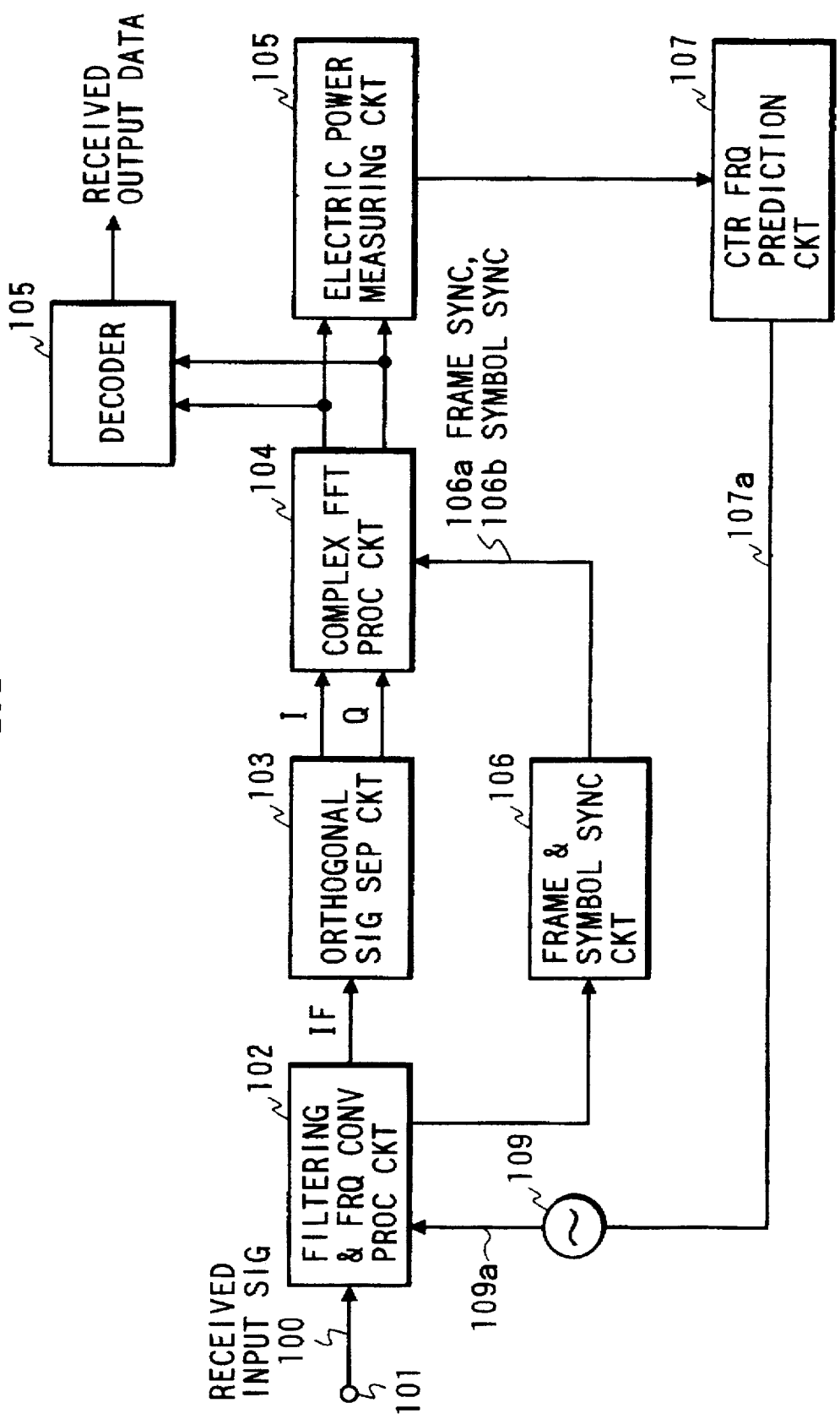
FIG. 1 is a block diagram of a receiving circuit of a first embodiment.

FIG. 1 is a block diagram of a receiving circuit of the first embodiment.

A transmission signal which is digitally-modulated through a coded orthogonal frequency division multiple modulation method, that is, a multi-carrier transmission method, and which includes a plurality of carriers having a center frequency, is received as a received input signal 100 supplied to an input terminal 101 of the receiving circuit of the first embodiment.

The receiving circuit of the first embodiment comprises a local oscillator 109 for generating a local oscillation signal 109a having a local oscillation frequency controlled in accordance with a frequency control signal 107a, a filtering and frequency conversion processing circuit 102 for affecting a filtering processing to the received input signal and frequency converting the filter transmitted with the local oscillation signal 109a for outputting an intermediate frequency signal IF, an orthogonal signal separating circuit 103 for separating the intermediate frequency into in-phase and quadrature-phase signals, i.e., complex baseband signals. Also, a complex FFT (fast Fourier transform) processing circuit 104 is provided for affecting complex FFT processing to the complex baseband signals to output a set of information represented by respective carriers every one symbol period. An electric power measuring circuit 105 measured electric powers of respective frequency components corresponding to multiplexed sub-carriers (multi-carriers) from the complex FFT processing circuit 104. Also, a center frequency prediction circuit 107 predicts a center frequency of the plurality of carriers from the result of measuring the electric powers of respective frequency components from the electric power measuring circuit 105 and for generating a frequency error signal, i.e., the frequency control signal 107a, from the predicted center frequency. Also, a frame and symbol synchronizing circuit 106 detects a frame synchronizing and symbol synchronizing through detecting a non-signal period such as a zero symbol and a reference signal just after the non-signal period and supplies a frame synchronizing signal 106a and a symbol synchronizing signal 106b indicative of a time window of the complex FFT processing circuit 104 which executes the complex FFT processing every symbol period. The generated frequency control signal 107a is supplied to the local oscillator 109 to control the local oscillation frequency.

An operation of the receiving circuit of the first embodiment will be described.

A transmission signal digitally-modulated with a coded orthogonal frequency division multiple modulation method which includes a plurality of carriers with a symmetric structure is transmitted and received. The received input signal is supplied to the input terminal 101 of the receiving circuit of the first embodiment.

The received input signal is supplied to the filtering and frequency conversion processing circuit 102 which affects filtering processing of the received input signal and frequency-converts the filtered input signal with the local oscillation signal generated by the local oscillator. The intermediate frequency signal is applied to the orthogonal signal separation circuit 103. The local oscillation frequency is controlled in accordance with the frequency control signal 107a. The orthogonal signal separating circuit 103 separates the intermediate frequency signal into an in-phase component I and quadrature-phase component Q, i.e., complex baseband signals. The complex FFT processing circuit 104 affects complex FFT processing to the complex baseband signals to output the set of information of respective frequency components corresponding to multi-carriers every one symbol period.

FIG. 2A is a graphical drawing of a spectrum of the transmission signal to the receiving circuit of the first embodiment. FIG. 2B is a graphical drawing of a spectrum of the multi-carriers to be received by the receiving circuit of the first embodiment when there is a frequency error.

An arrangement of the plurality of carriers in the transmission signal is predetermined and has a symmetrical structure, so that there is a center frequency as shown in FIG. 2A. Therefore, this center frequency can be detected when there is a frequency error in the center frequency due to transmission disturbance or the like and can be predicted by the result of measuring the electric powers of respective carriers obtained by the complex FFT processing using the symmetrical structure of the multi-carriers.

The electric power measuring circuit 105 measures electric powers of respective frequency components corresponding to the multi-carriers from the complex FFT processing circuit 104 with respect to the frequency base. The center frequency prediction circuit 107 predicts the center frequency of the plurality of carriers from the result of measurement of the electric powers of respective frequency components from the electric power measuring circuit 105 and generates the frequency error signal from the predicted center frequency. The generated frequency error signal, i.e., the frequency control signal 109a, is supplied to the local oscillator in the filtering and frequency conversion circuit 102 to control the local oscillation frequency.

The frame and symbol synchronizing circuit 106 detects frame synchronizing and symbol synchronizing through detecting the non-signal period such as a zero symbol and the reference symbol and supplies the frame synchronizing signal and the symbol synchronizing signal indicative of a time window to the complex FFT processing circuit 104. The complex FFT processing circuit 104 executes the complex FFT processing every symbol period.

The set of information of respective frequency components indicative of the multi-carriers is supplied to a decoder 108 which processes the set of information of respective frequency components and outputs received data.

As mentioned, according to the first embodiment, the receiving circuit for receiving a transmission signal digitally coded orthogonal-frequency-division multiplex-modulated to have multiplexed sub-carriers is provided. A local oscillator 109 generates the local oscillation signal 109a having the oscillation frequency controlled in accordance with the Frequency control signal 107a. The filtering and frequency conversion processing circuit (frequency conversion circuit) 102 responsive to the local oscillation signal, frequency converts the transmitted signal into an intermediate frequency signal. The orthogonal signal separation circuit 103 separates the intermediate frequency signal into in-phase I and quadrature-phase components Q. A complex FFT conversion circuit 104 affects the complex FFT conversion processing to the in-phase and quadrature-phase components and outputs conversion signals to be decoded arranged in a frequency base. An electric power measuring circuit 105 measures electric powers of the conversion signals. The center frequency prediction circuit 107 predicts the center frequency fcs of the multiplexed sub-carriers from the frequency distribution 202 of the electric powers detected by the electric power measuring circuit 105 and generates the frequency control signal 107a in accordance with the predicted center frequency. The local oscillator 109 generates the local oscillation signal 109a so as to reduce the detected frequency error between the oscillation frequency and the predicted frequency.

Figure 3A:
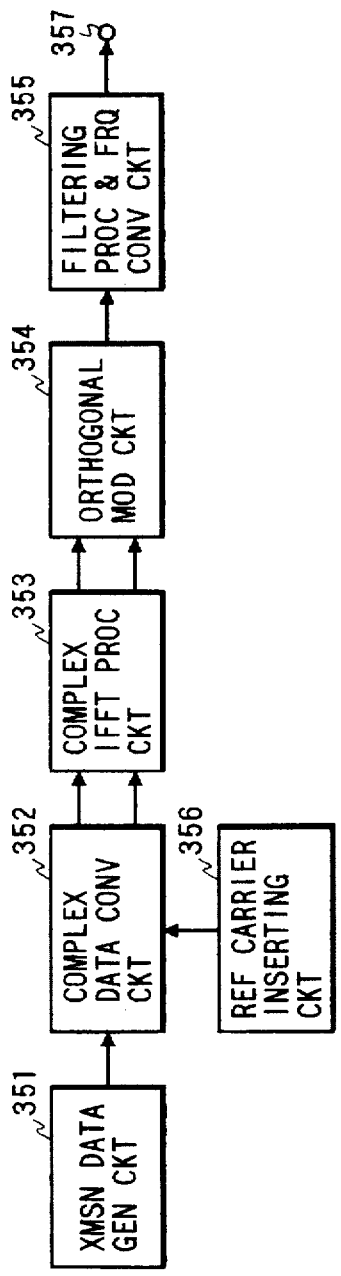
FIG. 3A is a block diagram of a transmission apparatus of a second embodiment.
Figure 3B:
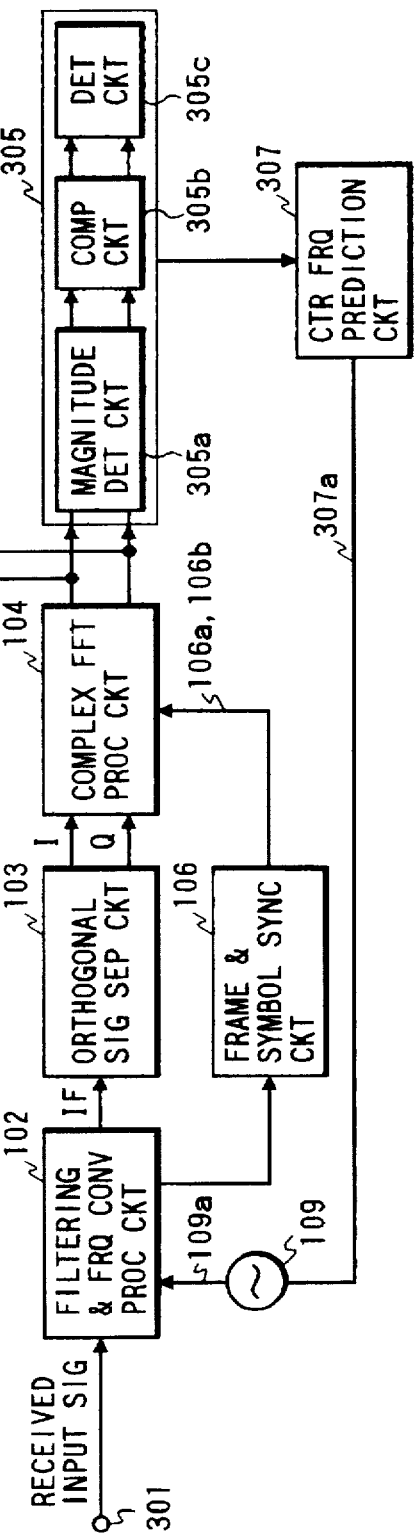
FIG. 3B is a block diagram of a receiving circuit on the receiving side of the second embodiment.

A second embodiment will be described. FIG. 3A is a block diagram of a transmission apparatus of the second embodiment. FIG. 3B is a block diagram of a receiving circuit of the second embodiment.

The transmission apparatus of the second embodiment comprises a transmission data generation circuit 351 for generating transmission data. A complex data conversion circuit 352 converts the transmission data to complex data and outputting complex data, and a complex IFFT (inverse fast Fourie transform) processing circuit 353 affects a complex IFFT processing to the complex data from the complex data conversion circuit 352. An orthogonal modulation circuit 354 orthogonal-modulates outputs of the complex IFFT processing circuit 353. A filtering processing and frequency converting circuit 355 filters the output of the orthogonal modulation circuit 354 and frequency-converts the filtered signals to transmit a multi-carrier signal including the reference carrier signal via a terminal 357. A reference carrier inserting circuit 356 inserts a reference carrier signal in the complex data conversion circuit 352.

The receiving circuit of the second embodiment comprises a local oscillator 109 for generating a local oscillation signal 109a having a local oscillation frequency controlled in accordance with a frequency control signal. A filtering and frequency conversion processing circuit 102 affects a filtering processing to a received input signal transmitted from the transmission apparatus in FIG. 3A, and frequency converts the filtered input signal with the local oscillation signal 109. An orthogonal signal separating circuit 103 separates the intermediate frequency signal into in-phase and quadrature-phase signals, i.e., complex baseband signals. A complex FFT processing circuit 104 affects complex FFT processing to the complex baseband signals to output a set of information of respective carriers every one symbol period, and a reference carrier extracting circuit 305 extracts the reference carriers having a predetermined pattern from the outputs of the complex FFT processing circuit 104. Also, a center frequency prediction circuit 307 predicts a center frequency of the plurality of carriers from the detected pattern of the reference carriers and generates a frequency error signal from the predicted center frequency. A frame and symbol synchronizing circuit 306 detects frame synchronizing through detecting an inserted synchronizing symbol and symbol synchronizing, and supplies a frame synchronizing signal and a symbol synchronizing signal indicative of a time window to the complex FFT processing circuit 104 which executes the complex FFT processing every symbol period. The generated frequency error signal, i.e., the frequency control signal, is supplied to the local oscillator 109 to control the local oscillation frequency.

An operation of the transmission apparatus of the second embodiment will be described.

The transmission data generation circuit 351 generates transmission data. The complex data conversion circuit 352 converts the transmission data to complex data and outputting complex data. When the reference carrier inserting circuit 356 requests the complex data conversion circuit 352 to insert reference carriers, it generates complex data for generating data for the reference carriers having a predetermined pattern. The complex IFFT processing circuit 353 affects the complex IFFT processing to the complex data from the complex data conversion circuit 352. The orthogonal modulation circuit 354 orthogonal-modulates outputs of the complex IFFT processing circuit 353. The filtering processing and frequency converting circuit 355 filters outputs of the orthogonal modulation circuit 354 and frequency-converts the filtered signals to transmit a multi-carrier signal including the reference carriers via the terminal 357. The reference carrier inserting circuit 356 inserts the reference carriers to the complex data conversion circuit 352.

The receiving side will be described.

The local oscillator 109 generates the local oscillation signal 109a having the local oscillation frequency controlled in accordance with the frequency control signal 307a. The filtering and frequency conversion processing circuit 102 affects a filtering processing to a received input signal and frequency-converts the filtered input signal with the local oscillation signal 109a and outputs the intermediate frequency signal. The orthogonal signal separating circuit 103 separates the intermediate frequency into in-phase and quadrature-phase signals, i.e., complex baseband signals. The complex FFT processing circuit 104 affects the complex FFT processing to the complex baseband signals to output a set of information of respective carriers, i.e., frequency components corresponding to the multi-carriers, every one symbol period. The reference carrier extracting circuit 305 extracts the reference carriers having the predetermined pattern from the outputs of the complex FFT processing circuit 304. The center frequency prediction circuit 307 predicts the center frequency of the multi-carriers from the detected pattern of the frequency components corresponding to the multi-carriers and generates the frequency error signal, i.e., frequency control signal, from the predicted center frequency. The frame and symbol synchronizing circuit 106 detects a frame synchronizing by detecting the non-signal period and the reference symbol provided in the data train i and a symbol synchronizing and supplies the frame synchronizing signal 106a and the symbol synchronizing signal indicative of a time window to the complex FFT processing circuit 104 which executes the complex FFT processing every symbol period.

The generated frequency error signal is supplied to the local oscillator 109 to control the local oscillation frequency.

Figure 4:
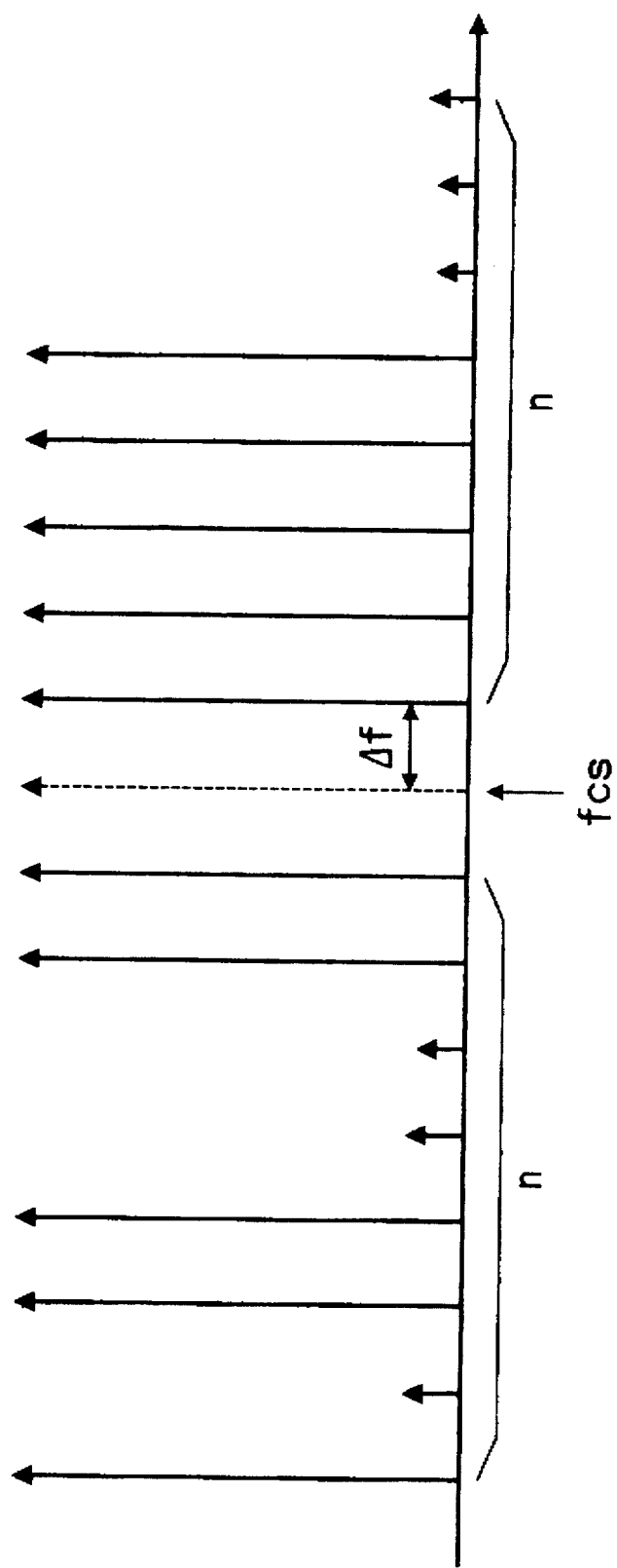
FIG. 4 is a graphical drawing of a spectrum of the transmission signal of a second embodiment including multi-carriers.

FIG. 4 is a graphical drawing of a spectrum of the transmission signal of the second embodiment including multi-carriers. In the second embodiment, the structure of the multi-carriers is not uniform or asymmetrical, so that it is not simple to determine the center frequency. Then, at a suitable timing, reference data for generating the multi-carrier signals having a predetermined pattern is supplied to the complex data conversion circuit 352. Therefore, reference multi-carriers are transmitted.

Figure 5:
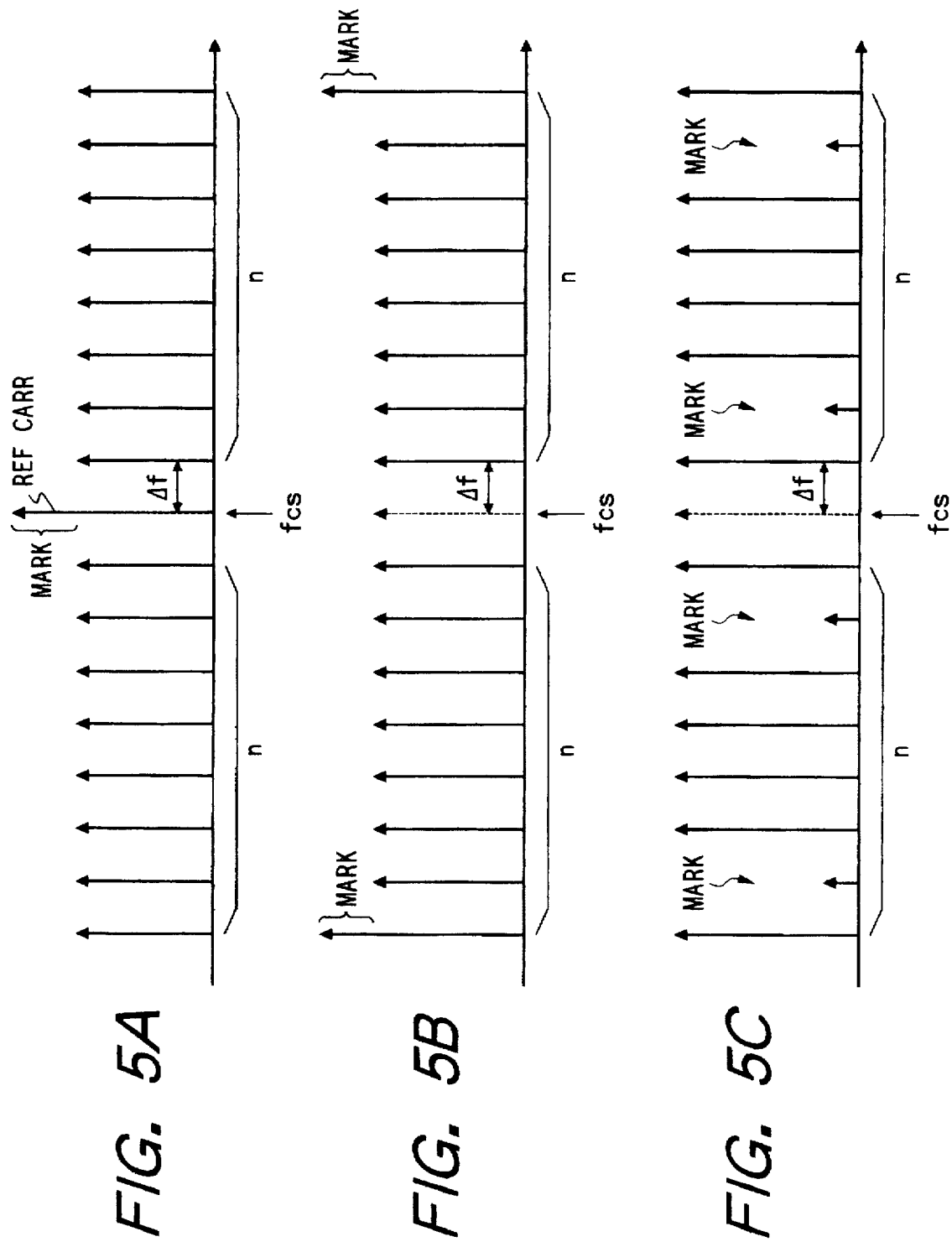
FIGS. 5A to 5C are graphical drawings of the reference multi-carriers of the second embodiment.

FIGS. 5A to 5C are graphical drawings of the reference multi-carriers of the second embodiment. In FIG. 5A, a reference carrier of the center frequency of the multi-carriers has a larger intensity than other carriers. In FIG. 5B, the lowest and highest frequency carriers have larger intensity than other carriers. In FIG. 5C, predetermined carriers have smaller intensities than other carriers or predetermined carriers are not transmitted, that is, there is an intermission in the frequency base. The reference carrier extracting circuit 305 extracts the reference carrier or carriers and the center frequency prediction circuit detects a center frequency and generates a frequency error signal. This is also applicable in the case of a distribution of multi-carrier in advance.

As mentioned, the receiving circuit of the second embodiment for receiving transmitted signal digitally coded orthogonal-frequency-division-multiplex-modulated and includes multiplexed sub-carriers including a reference carrier having the first characteristic (magnitude) distinguishable from any of other multiplexed sub-carriers (multi-carriers) is provided. It comprises local oscillator 109 for generating the local oscillation signal 109a with the oscillation frequency controlled in accordance with the frequency control signal 307a. The filtering and frequency conversion processing circuit (frequency conversion circuit) 102 is responsive to the local oscillation signal 109a for frequency converting the transmitted signal into the intermediate frequency signal. The orthogonal signal separation circuit 103 separates the intermediate frequency signal into the in-phase component I and the quadrature-phase component Q. The complex FFT conversion circuit 104 for affecting the complex FFT conversion processing to the in-phase and quadrature-phase components and outputting conversion signals to be decoded. The reference carrier detection (extracting) circuit 305 detects the one conversion signal which has the second distinguishable characteristic (magnitude) corresponding to the first distinguishable characteristic. The center frequency prediction circuit 307 detects the frequency of the one conversion signals which has the second distinguishable characteristic from the reference carrier detection circuit 305, and predicts the center frequency of the transmitted signal from the detected frequency and generates the frequency control signal in accordance with the predicted center frequency.

In the receiving circuit of the second embodiment, the first characteristic is that a magnitude of the reference carrier has a larger magnitude than any other multiplexed sub-carriers as shown in FIG. 5A, and the second characteristic is that a magnitude of one of the conversion signals has a larger magnitude than any other conversion signals correspondingly. The reference carrier detection circuit 305 comprises: the magnitude detection circuit 305a for detecting magnitudes of the conversion signals from the complex FFT conversion circuit 104; a comparing circuit 305a for comparing the detected magnitudes and a detecting circuit 305c for detecting one of the conversion signals corresponding to the reference carrier from the result of the comparing circuit 305b.

In other words, the receiving circuit of the second embodiment for receiving a transmission signal digitally coded orthogonal-frequency-division-multiplex-modulated including multiplexed sub-carriers having a first distribution including a first mark portion (MARK) at predetermined frequency, comprises a local oscillator 109 for generating the local oscillation signal 109a having the oscillation frequency controlled in accordance with the frequency control signal 109a. A filtering processing and frequency conversion circuit 102 responsive to the local oscillation signal 109a frequency converts the transmitted signal into the intermediate frequency signal IF. The orthogonal signal separation circuit 103 separates the intermediate frequency signal IF into the in-phase component I and the quadrature-phase component Q. The complex FFT conversion circuit 104 affects the complex FFT conversion processing to the in-phase and quadrature-phase components and outputs conversion signals to be decoded. The conversion signals have a second distribution, corresponding to the first distribution as shown in FIG. 5C, the second distribution having the second mark portion corresponding to the first mark portion (MARK). The reference carrier extracting circuit (a mark detection circuit) 305 detects the second mark portion. The center frequency prediction circuit 307 detects the frequency of the second marker portion and predicts the center frequency of the multiplexed sub-carriers from the detected second marker portion and generating the frequency control signal in accordance with the predicted center frequency.

In this receiving circuit, the first mark portion MARK comprises one of the multiplexed sub-carriers having a different magnitude from any of other the multiplexed sub-carriers. The reference carrier detection circuit (mark detection circuit) 305 comprises: the magnitude detection circuit 305a for detecting magnitudes of the conversion signals; the comparing circuit 305b for comparing the detected magnitudes to each other; and the detection circuit 305c for detecting the second mark portion from the result of the comparing circuit 305b. In this receiving circuit, the multiplexed sub-carriers have the first distribution as shown in FIG. 5C such that the multiplexed sub-carriers recurrently arranged in frequency base with the first intermission (MARK) at the predetermined frequency as the first marker portion, the conversion signals have the second distribution such that the conversion signals are recurrently arranged in a frequency base with a second intermission as the second marker portion. The reference carrier detection circuit 305 (mark detection) comprises: the magnitude detection circuit 305a (first detecting circuit) for detecting the magnitudes of frequency components of the conversion signal; the comparing circuit 305b compares the magnitudes each other and detects the second distribution; and the detection circuit 305c is responsive to the magnitude detection circuit 305 for detecting the second intermission to detect second marker portion.

A third embodiment will be described.

Figure 6:
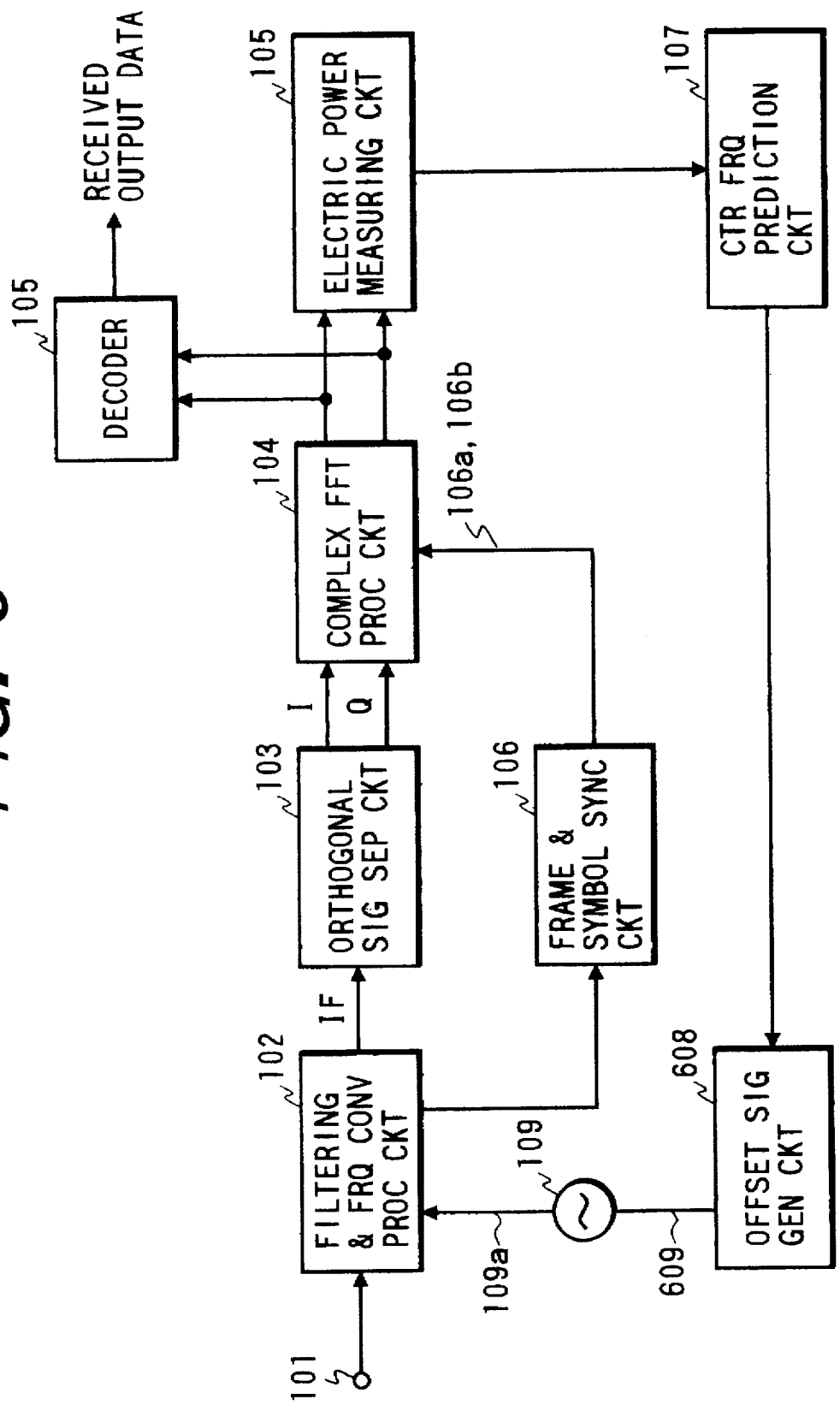
FIG. 6 is a block diagram of a receiving circuit of a third embodiment.
Figure 7A:
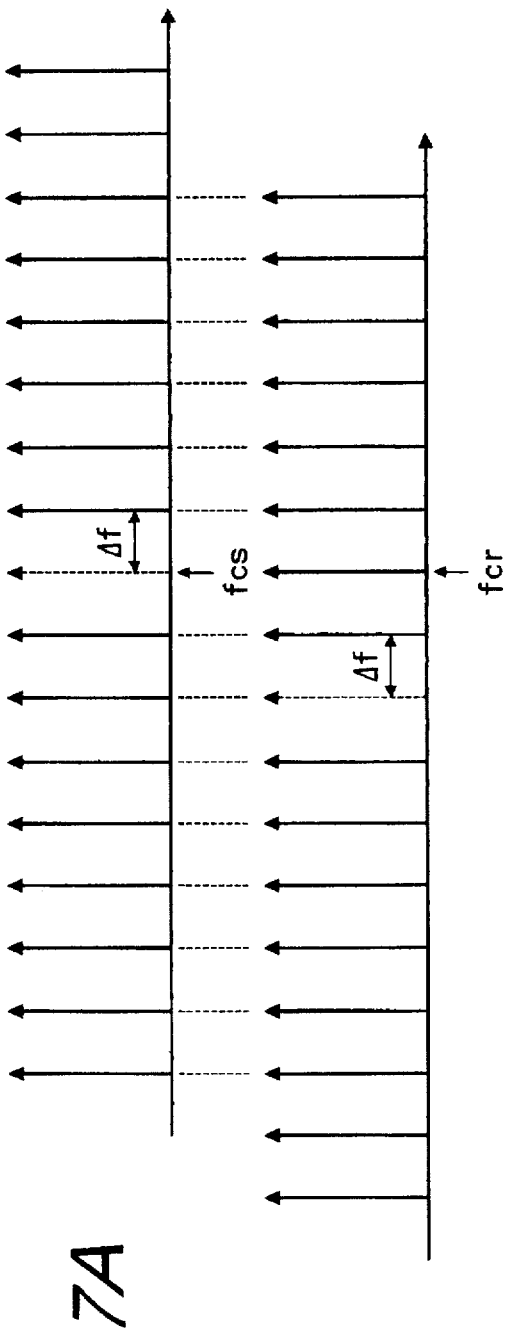
FIGS. 7A and 7B are graphical diagrams of a spectrum of carriers in the third embodiment.
Figure 7B:
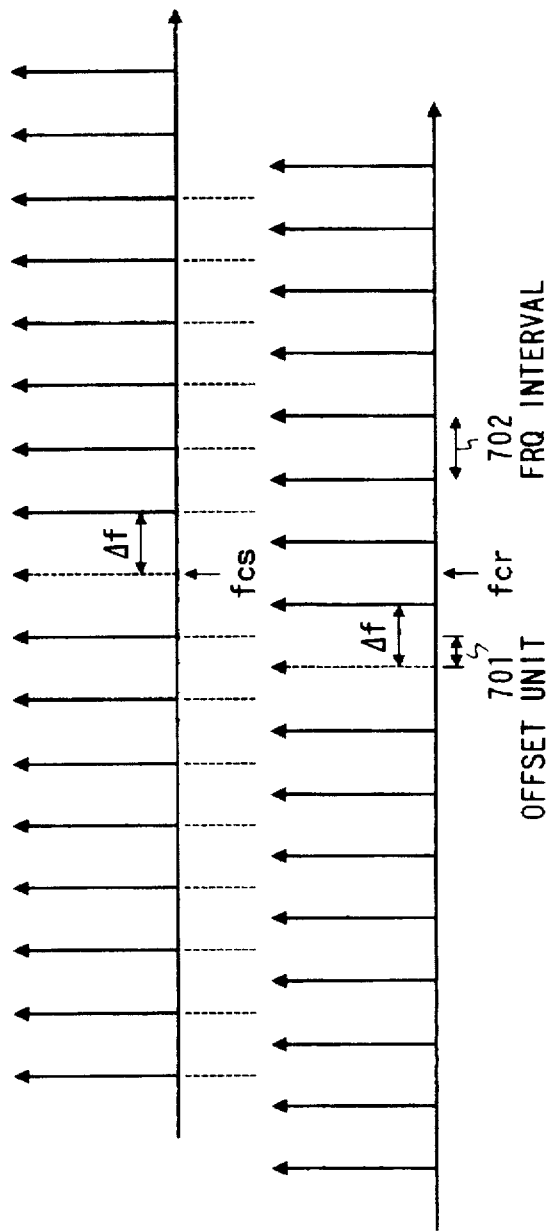

FIG. 6 is a block diagram of a receiving circuit of the third embodiment. FIGS. 7A and 7B are graphical diagrams of spectrums of carriers in the third embodiment.

The receiving circuit of the third embodiment has basically the same structure as the receiving circuit of the first embodiment. A difference between the receiving circuits of the first and third embodiments is in that an offset signal generation circuit 608 is further provided. The offset signal generation circuit 608 is responsive to the center frequency prediction circuit 107 and generates an offset signal 609 which causes the oscillation frequency of the oscillator 109 to change the local oscillation frequency with a unit 701 less than a frequency interval 702 of the multiplexed sub-carriers. The unit 701 is a half of the frequency interval 702 of the multiplexed sub-carriers or less than the half of the frequency interval 702.

An operation will be described.

The receiving circuit of the third embodiment operates as similar to the first embodiment basically.

In this invention, the complex FFT processing circuit 104 is used as a detection circuit for detecting frequency components corresponding to the multiplexed sub-carriers and indirectly detecting the distribution of the multiplexed sub-carriers. The complex FFT circuit 104 has a resolution derived from the FFT operation and if the local oscillation frequency is offset from the center frequency by zero or an integer times the resolution of the complex FFT circuit, the center frequency can be predicted correctly. However, if the local oscillation frequency is offset from the center frequency by a half of the resolution of the complex FFT circuit, the center frequency cannot be predicted.

Then, in this embodiment, the offset signal generation circuit 608 generates the offset signal 609 such that the offset signal 609 changes the oscillation frequency with the unit 701 less than the frequency interval 702 of the multiplexed sub-carriers. The unit 701 is a half of the frequency interval 702 of the multiplexed sub-carriers or less than the half of the frequency interval 702. Then, an amount of control of the oscillation frequency is optimized by observing the electric powers measured by the electric power measuring circuit 105.

This offset signal generation circuit 608 can be further provided between the center frequency prediction circuit 307 and the filtering and frequency conversion processing circuit 102 of the receiving circuit of the second embodiment shown in FIG. 3 to make it easy to detect a peak of the reference carrier.

As described above, the receiving circuit of the third embodiment, in addition to the structure of the first and second embodiment, further comprises the offset signal generation circuit 608 responsive to the center frequency prediction circuit 107 for generating the offset signal causing the oscillation frequency to change the local oscillation frequency with the unit less than the frequency interval Δf of the multiplexed sub-carriers.

As mentioned, the oscillation frequency is finely adjusted within the frequency interval 702, so that the center frequency can be correctly predicted though the center frequency of the multiplexed sub-carriers is offset from the oscillation frequency by a half of the frequency interval 702.

Figure 8:
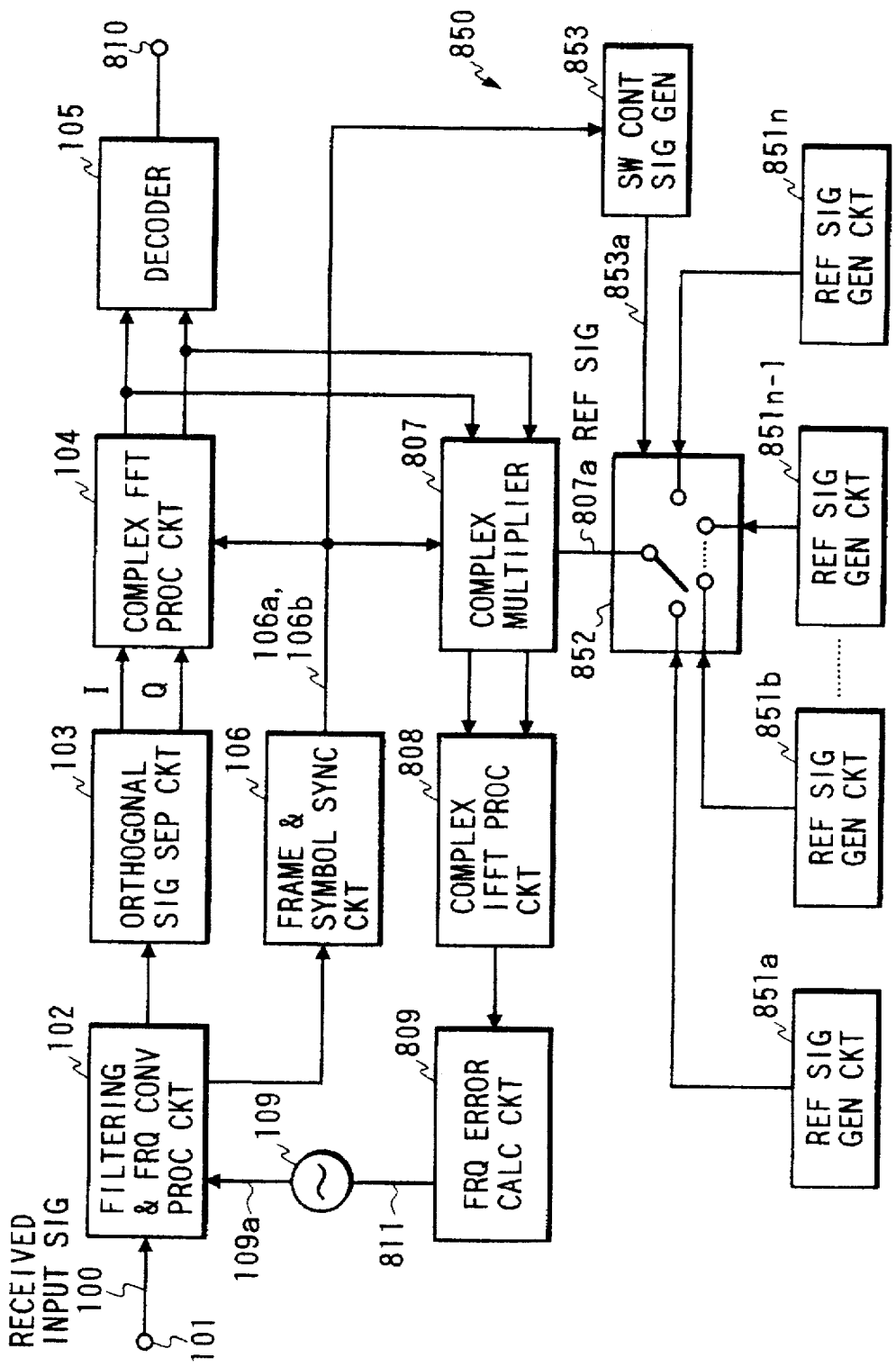
FIG. 8 is a block diagram of a receiving circuit of a fourth embodiment.

A fourth embodiment will be described. FIG. 8 is a block diagram of a receiving circuit of the fourth embodiment.

The receiving circuit of the fourth embodiment for receiving a transmitted signal 101 digitally coded orthogonal-frequency-division multiplex-modulated by data every symbol period to have multiplexed sub-carriers, the transmission signal including reference symbol data having a low complex auto-correlation. A local oscillator 109 generates a local oscillation signal 109a having an oscillation frequency controlled in accordance with a frequency control signal 811. A frequency conversion circuit 102 responsive to the local oscillation signal 109a frequency converts the received input signal into an intermediate frequency signal IF. An orthogonal signal separation circuit 103 for separating the intermediate frequency signal IF into an in-phase component I and an quadrature-phase component Q. A complex FFT conversion circuit 104 affects a complex FFT conversion processing to the in-phase and quadrature-phase components, and generates conversion signals to be decoded every symbol period indicated by a symbol period synchronizing signal 106b. A complex multiplier circuit 807 complex multiplies the conversion signals by a reference signal and detects a correlation between the conversion signal and the reference signal. A reference signal generation circuit 850 generates the reference signal having complex values corresponding to the reference symbol data, the complex values being successively changed every predetermined interval within the symbol period in response to a switching control signal 853a so as to change the correlation such that the local oscillation frequency is changed around an intermediate of the frequency multiplexes sub-carriers. An inversion complex FFT conversion circuit 808 affects an inversion complex FFT conversion processing to outputs of the complex multiplier circuit 807 every symbol period. A frequency error calculation circuit 809 calculate a frequency error of the oscillation frequency from results of the complex inversion FFT conversion circuit 808 within the symbol period and generates the frequency control signal 811 in accordance with the frequency error.

The reference signal generation circuit 850 includes a switching control signal generation circuit 853 responsive to the symbol synchronizing signal 106a for generating the switching control signal, a switch circuit 852 responsive to the switching control signal, and reference signal generation circuits 851a to 851n. The switch circuit 852 successively outputting one of reference signals from the reference signal generation circuits 851a to 851n within the symbol period. The reference signal generation circuit 850 outputs a selected reference signal corresponding to the reference symbol data which is included in the transmission signal to obtain the frequency control of the oscillation frequency toward the center frequency. The selected reference signals are generated such that complex values of the reference symbol are slightly changed. Therefore, the selected reference signal from the reference signal generation circuit 850 is generated with complex values slightly changed within the reference symbol period. That is, each of the reference signal generation circuits 851a to 851n generates an output corresponding to the outputs of the complex FFT processing circuit 104 when this receiving circuit receives the reference symbol data in the condition that there is a frequency deviation of the received input signal 100 and the local oscillation signal. A degree of the frequency deviation is changed in the order of the reference signal generation circuits 851a to 851n.

As mentioned, the transmission signal digitally coded orthogonal-frequency-division multiplex-modulated by data every symbol period to have multiplexed sub-carriers is supplied to the filter circuit 102a, wherein the reference symbol data is transmitted at a suitable timing. The local oscillator 109 generates the local oscillation signal 109a having an oscillation frequency controlled in accordance with a frequency control signal 811. The frequency conversion circuit 102 responsive to the local oscillation signal frequency-converts the transmitted signal. The orthogonal signal separation circuit 103 separates the received input signal into in-phase and quadrature-phase components I and Q. The complex FFT conversion circuit 104 affects the complex FFT conversion processing to in-phase and quadrature-phase components I and Q and outputs conversion signals indicative of data of respective frequency divided carriers every the symbol period represented by the symbol period synchronizing signal 106a.

When the center frequency is equal to the local oscillation frequency, the decoder 105 decodes the conversion signals from the complex FFT processing circuit 104.

However, if the local oscillation frequency largely deviates from the center frequency, the complex correlation between the conversion signals and the reference signal 807a provides no efficient data. Then, it is considered to successively change the local oscillation frequency to detect multi-carriers. However, controlling the oscillation frequency to obtain a correlation between the center frequency and the oscillation frequency can be made to calculate the frequency error only once for one reference symbol, so that if a frame length is long and the frequency deviation is large, it takes a long interval to detect the center frequency. Then, in this embodiment, to take the correlations a plurality of times for one frame (one reference symbol unit), the reference signals having different frequencies are successively supplied to the complex multiplier 807 for one frame. That is, the switch circuit 852 successively outputs one of slightly different reference signals from the reference signal generation circuit 851a to 851n for one frame. Therefore, the calculation of the frequency error is performed efficiently within one frame (symbol).

The reference signal may be changed to have a frequency which is an integer times the frequency interval of carriers. Alternately, the frequency of the reference signal is periodically and successively changed by a unit less than the frequency interval of the carriers. The values of the reference signal may also be generated by storing data in a recording medium or by shifting data in a register for calculation of the correlation.

Figure 9:
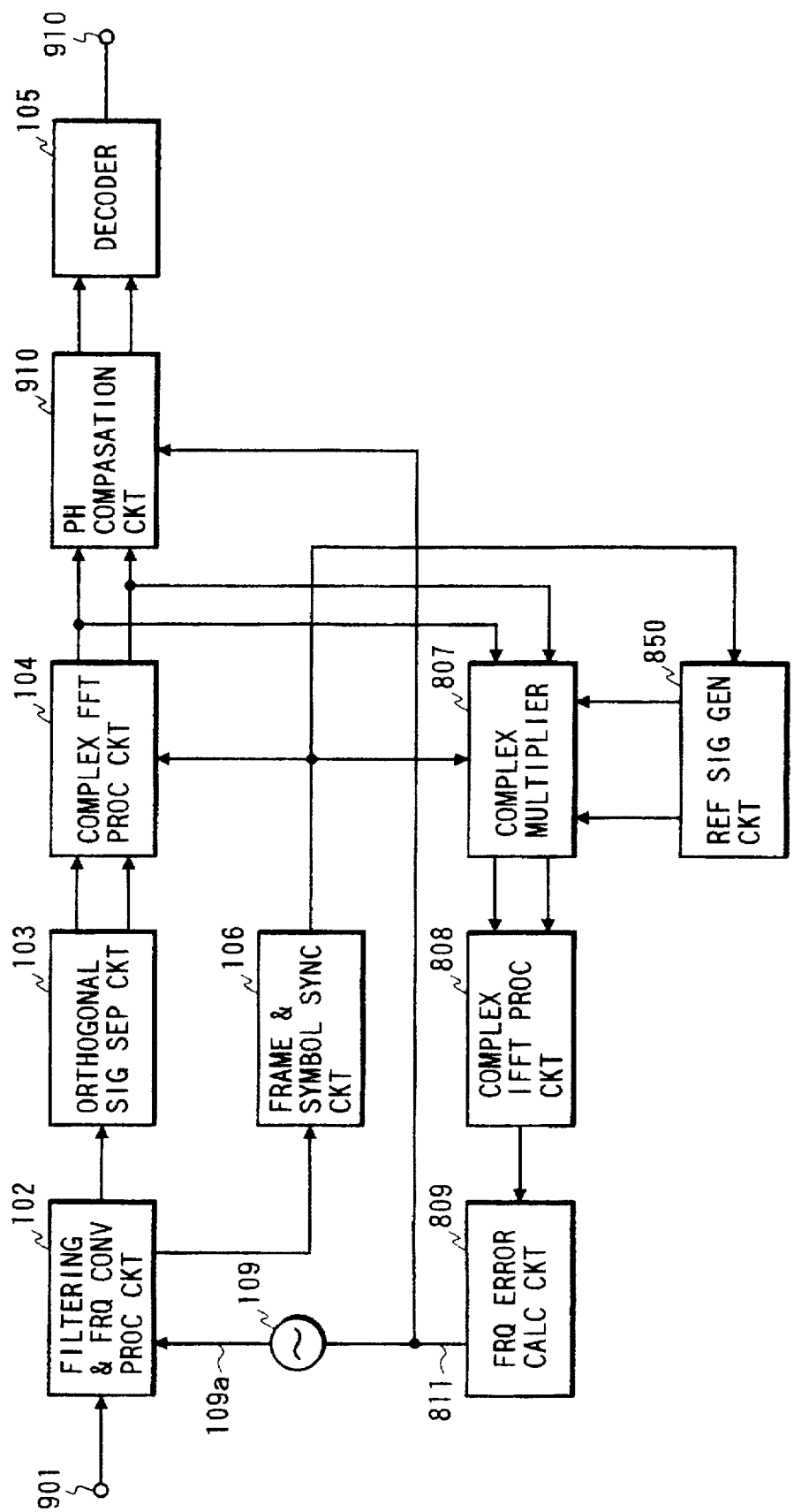
FIG. 9 is a block diagram of a receiving circuit of a fifth embodiment.
Figure 10:
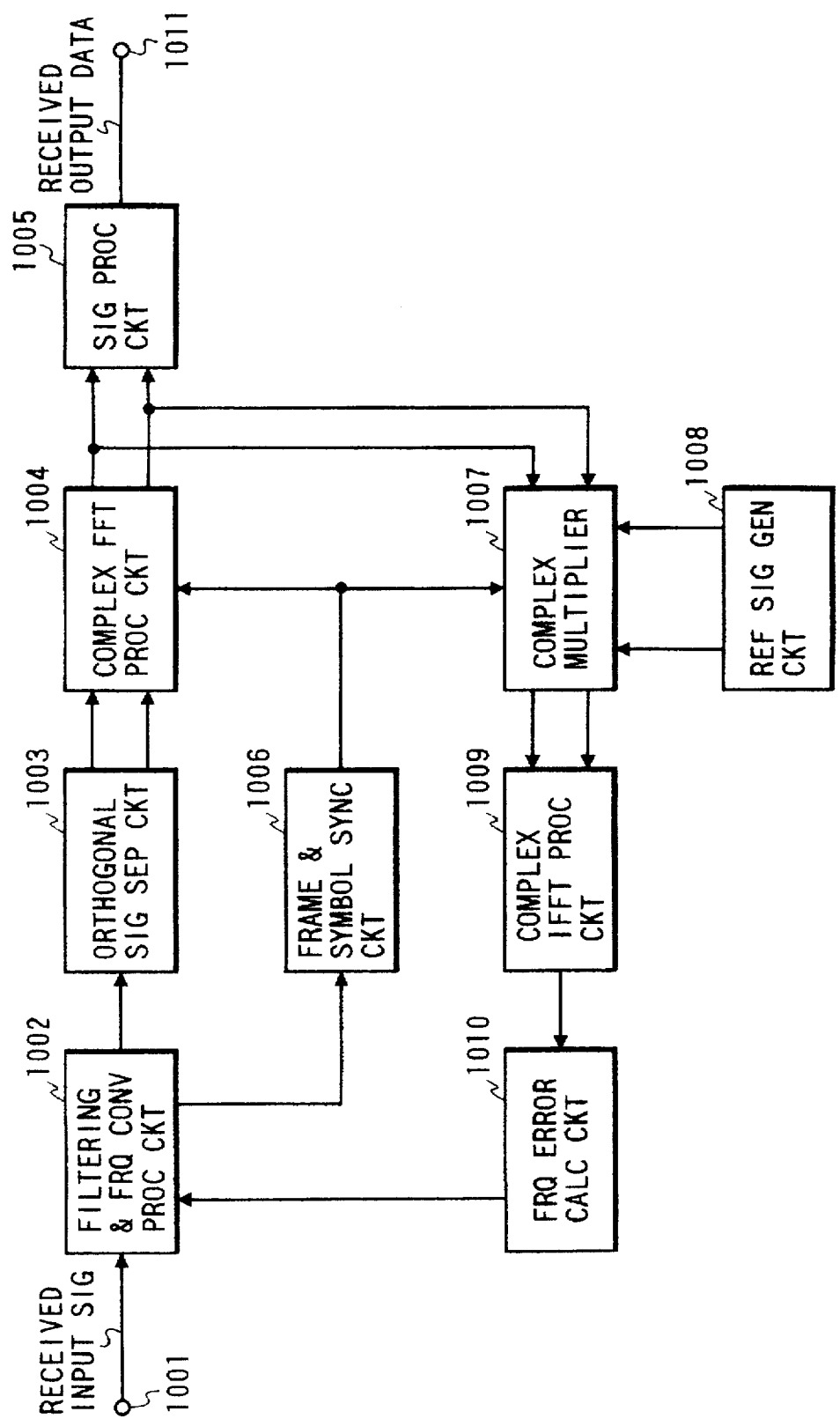
FIG. 10 is a block diagram of a prior art receiving circuit used for demodulating a coded orthogonal frequency division multiplex modulation signal.

A fifth embodiment will be described. FIG. 9 is a block diagram of a receiving circuit of the fifth embodiment.

The receiving circuit of the fifth embodiment has the same structure as the receiving circuit of the fourth embodiment basically. A difference is in that a phase compensation circuit 910 for compensating phases of the conversion signals from the complex FFT processing circuit 104 is provided between the complex FFT processing circuit 104 and the decoder 105.

The phase compensation circuit 910 compensates phases of the conversion signals in accordance with the detected frequency error, i.e., the frequency control signal, from the frequency error calculation circuit 809 and supplies phase compensated signals to the decoder 105.

In the fourth embodiment, the frequency prediction is possible by calculating the correlation between the transmitted reference symbol and the reference symbol of the receiving side. However, the frequency control is actually affected at the frame following the frame where the calculation is made, so that the decoding is affected by the frequency deviation. Therefore, the decoded data may have an error. Then, in this embodiment, the correlation calculation result in the complex multiplier 807 is supplied to the phase compensation circuit 910 as a feed forward in addition to the feed back to the local oscillator filter and frequency conversion circuit 102, so that the phase error is compensated within the frame while the complex correlation is successively detected. Therefore, the decoding is more correctly done for the frame while the correlation is detected.

As mentioned, according to this invention, at first, the electric power measuring circuit 105 is provided to detect a distribution of electric powers of the conversion signals corresponding to the multiplexed sub-carriers in the frequency base and to detect a center frequency of the multiplexed sub-carriers. The local oscillation frequency is controlled in accordance with the predicted center frequency of the multiplexed sub-carriers. Therefore, the center frequency is detected by detecting the distribution of frequency components of the conversion signals corresponding to the multiplexed sub-carriers, so that if there is a large frequency deviation between the local oscillation frequency and the center frequency, the frequency prediction can be provided.

In the case that a reference symbol is included in the transmission signal and a correlation is detected between the transmitted reference symbol and the reference symbol of the receiving side, a plurality of reference signals are provided and one of the reference signals is successively selected to affect the detection of the correlation, so that a plurality of times calculations can be made for one frame and thus, a frequency control signal is provided, so that a frequency locking characteristic is improved.

Moreover, the calculated frequency error from the detection of the correlation is further supplied to the phase compensation circuit to compensate the phases of the conversion signals from the complex FFT processing circuit 104, so that a deterioration in the decoded data due to a sudden frequency change can be suppressed.

What is claimed is:

1. A receiving circuit for receiving a transmitted digitally coded- orthogonal-frequency-division-multiplex-modulated signal and which includes multiplexed sub-carriers having a first distribution including a first marker portion at a predetermined frequency comprising one of said multiplexed frequency sub-carriers having a magnitude which is different in magnitude than the remaining sub-carriers, said receiving circuit comprising:

a local oscillator for generating a local oscillation signal having an oscillation frequency controlled in accordance with a frequency control signal;

frequency conversion means responsive to said local oscillation signal for frequency-converting said transmitted signal into an intermediate frequency signal;

orthogonal signal separation means for separating said intermediate frequency signal into in-phase and quadrature-phase components;

complex FFT conversion means for affecting a complex FFT conversion processing to said in-phase and quadrature-phase components and outputting conversion signals to be decoded, said conversion signals having a second distribution, corresponding to said first distribution, said second distribution having a second marker portion corresponding to said first marker portion;

marker detection means for detecting said second marker portion comprising:
(a) magnitude detection means for detecting magnitudes of said conversion signals;
(b) comparing means for comparing said detected magnitudes with each other; and
(c) means for detecting said second marker portion from the result of said comparing means;

frequency detection means for detecting a frequency of said second marker portion; and prediction means for predicting a center frequency of said multiplexed sub-carriers from said second marker portion from said frequency detection means and generating said frequency control signal in accordance with said predicted center frequency.

2. A receiving circuit for receiving a transmitted signal digitally coded-orthogonal-frequency-division-multiplex-modulated by data signal every symbol period to have multiplexed sub-carriers, said transmitted signal including a reference symbol data, comprising:

a local oscillator for generating a local oscillation signal having an oscillation frequency controlled in accordance with a frequency control signal;

frequency conversion means responsive to said local oscillation signal for frequency converting said transmitted signal into an intermediate frequency signal;

orthogonal signal separation means for separating said intermediate frequency signal into in-phase and quadrature-phase components;

complex FFT conversion means for effecting a complex FFT conversion processing to said in-phase and quadrature-phase components and outputting conversion signals to be decoded every said symbol period;

complex multiplier means for complex multiplying said conversion signals by a reference signal and detecting a correlation between said conversion signals and said reference signal;

reference signal generation means for generating said reference signal having complex values corresponding to said reference symbol, said complex values being successively changed every predetermined interval within said symbol period so as to change said correlation such that said local oscillation frequency is changed around an intermediate frequency of said multiplexed sub-carriers;

inversion complex FFT conversion means for affecting a complex inversion FFT conversion processing of outputs of said complex multiplier means every said symbol period; and frequency error calculation means for calculating a frequency error of said oscillation frequency from results of said complex inversion FFT conversion means within said symbol period and generating said frequency control signal in accordance with said frequency error, and phase compensation means for compensating phases of said conversion signals in accordance with said detected frequency error and outputting phase compensated signals to be decoded.

3. A receiving circuit for receiving a transmitted digitally coded-orthogonal-frequency-division-multiplex-modulated signal which includes multiplexed sub-carriers having a first distribution including a first marker portion at a predetermined frequency, said multiplexed sub-carriers being recurrently arranged in a frequency base with a first intermission at said predetermined frequency as said first marker portion, comprising:

a local oscillator for generating a local oscillation signal having an oscillation frequency controlled in accordance with a frequency control signal;

frequency conversion means responsive to said local oscillation signal for frequency-converting said transmitted signal into an intermediate frequency signal;

orthogonal signal separation means for separating said intermediate frequency signal into in-phase and quadrature-phase components;

complex FFT conversion means for effecting a complex FFT conversion processing to said in-phase and quadrature-phase components and outputting conversion signals to be decoded, said conversion signals having a second distribution, such that said conversion signals are recurrently arranged in a frequency base with a second intermission as a second marker portion, corresponding to said first intermission;

marker detection means for detecting said second marker portion comprising:
  (a) detecting means for detecting said second distribution from said conversion means; and
  (b) detection means responsive to said detecting means for detecting said second intermission to detect said second marker portion;

frequency detection means for detecting a frequency of said second marker portion; and prediction means for predicting a center frequency of said multiplexed sub-carriers from said second marker portion from said frequency detection means and generating said frequency control signal in accordance with said predicted center frequency.

\* \* \* \* \*